US005537936A

United States Patent [19]
Cordrey

[11] Patent Number: 5,537,936
[45] Date of Patent: *Jul. 23, 1996

[54] SUPPORT STRUCTURE FOR SUPPORTING A LOAD

[75] Inventor: Daniel Cordrey, Bedford, Tex.

[73] Assignee: Lin Pac, Inc., Atlanta, Ga.

[*] Notice: The term of this patent shall not extend beyond the expiration date of Pat. No. 5,463,965.

[21] Appl. No.: 380,510

[22] Filed: Jan. 30, 1995

Related U.S. Application Data

[63] Continuation-in-part of Ser. No. 190,481, Feb. 2, 1994, Pat. No. 5,463,965.

[51] Int. Cl.$^6$ ................................................ B65D 19/06
[52] U.S. Cl. ..................... 108/51.3; 108/51.1; 108/165; 108/180
[58] Field of Search ........................... 108/51.3, 51.1, 108/165, 180

[56] References Cited

U.S. PATENT DOCUMENTS

| | | | |
|---|---|---|---|
| 5,129,329 | 7/1992 | Clasen | 108/51.3 |
| 5,327,839 | 7/1994 | Herring et al. | 108/51.3 |
| 5,463,965 | 11/1995 | Cordrey | 108/51.3 |

Primary Examiner—Peter M. Cuomo
Assistant Examiner—Rodney B. White
Attorney, Agent, or Firm—Finnegan, Henderson, Farabow, Garrett & Dunner

[57] ABSTRACT

A support structure for supporting a load comprises a core of connected strips including spacer strips of corrugated material and at least one bent strip having a plurality of laminated layers. The bent strip is disposed between opposing spacer strips and secured at bend surfaces along the bent strip. The bent strip and the opposing spacer strips have edge surfaces for supporting the load. The edge surfaces define a plane substantially perpendicular to the bend surfaces. The spacer strips and bent strips are preferably formed of material selected from plastic, paper, and metal. The opposing spacer strips may be substantially parallel, curved, or any combination of the two to provide a variety of desired shapes. The bent strip may be creased at substantially equal intervals to form bend surfaces along opposite sides of the bent strip. An adhesive is applied along the bend surfaces for securing the bent strip to opposing spacer strips and for holding the bent strip at a predetermined pitch angle. A cover may be wrapped around a substantial portion of the core for further reinforcing and restricting movement of the strips. The cover is preferably adhesively secured to the core.

67 Claims, 7 Drawing Sheets

SUPPORT STRUCTURE FOR SUPPORTING A LOAD

BACKGROUND OF THE INVENTION

This is a continuation-in-part of application Ser. No. 08/190,481, filed on Feb. 2, 1994 now U.S. Pat. No. 5,463, 965.

The present invention relates to a structure for supporting a load and, more particularly, to a durable skid of recyclable paperboard.

Wood, metal, plastic, and paper are frequently manufactured into load supporting devices. One of the least expensive and most easily manipulated materials is paper. Various structures, such as corrugated paperboard, take advantage of the strength of paper by properly forming items to exploit paper's inherent characteristics. Specifically, a strip of corrugated paperboard is readily bent traversely of its plane, however, the strip has considerable tensile and compressive strength when subjected to edgewise pressure.

A supporting structure, such as a shelf, can be made from paper. Typically, the paper or corrugated paperboard is cut to lay across a plurality of brackets. However, multiple layers of the paper or corrugated paperboard must be built-up to provide the desired strength. Unfortunately, this built up mass adds weight, size and cost to the end product and places the load traverse to the plane of the shelf.

Another approach is to take advantage of the tensile and compressive strength of paper or corrugated paperboard under edgewise pressure. However, while strength is considerably increased, in a support structure resulting from a solid block of paper or from multiple layers of corrugated paperboard secured together with their respective edges turned toward the direction of the load, the weight and cost of the product is unacceptable. For example, multiple layers of triple-wall paperboard comprising three corrugated or fluted layers of paper placed between and secured to four planar paperboard layers can be secured together and used to exploit the edgewise strength of the paperboard. See, for example, U.S. Pat. No. 3,199,764. However, the same high density, weight, and cost drawbacks exist.

Various support structures for supporting a load have taken advantage of the relative low cost and pliable nature of paper. However, a less dense, higher strength, and more rigid structure for supporting a load is needed while maintaining low cost and light weight.

For example, pallets and skids of corrugated paperboard have gained considerable popularity within the industry for use in transporting various goods. In comparison to wooden pallets, corrugated paperboard, pallets and skids are lighter to transport and less expensive to make. Additionally, paperboard skids can be shredded for disposal, recycled to reduce refuse costs, and nonreturnable to eliminate return transportation costs. Corrugated paperboard skids are even lighter and less expensive than paperboard pallets. Since the skids do not have bottom slats they occupy less space in storage and shipping due to the advantage offered by alternate stacking.

U.S. Pat. No. 4,936,229 discloses a pallet having two flat sheets of cardboard separated by a plurality of individual layers of cardboard runners, which are adhesively connected to the sheets. In this design, strength and rigidity are given up in exchange for simplicity and cost savings.

A more intricate design is disclosed in U.S. Pat. No. 4,979,446. The '446 patent uses sheets of corrugated paperboard with holes, scores, and creases to make each stringer. The sheets are intricately folded to make a stringer having a vertically oriented core surrounded by alternating vertical and horizontal panels, thereby encasing most of the otherwise exposed corrugated fluting. The stringers interconnect to form a pallet. While the latter design is stronger and more rigid than the former, the resulting pallet is more complicated and costly.

As with the paper support structures described above, support structures made of metal and/or plastic are available with varying degrees of strength and rigidity. The same principles applicable to exploiting the strength of paper by utilizing the corrugation process may be applied with metal and plastic. As with paper, plastic and metal may be increased and thickened to provide the desired strength. However, with this buildup of mass comes weight, size, and cost to an end product. Optimally, a support structure should have a high strength-to-weight ratio that optimizes the material's strength characteristics and minimizes the amount of material utilized to maintain low cost.

In light of the foregoing, there is a need for a support structure which has the desired strength and rigidity to support a load, yet is relatively light and inexpensive. In particular, there is a need for a corrugated skid which has the necessary strength and rigidity to transport bulk goods, yet is relatively simple in design and correspondingly less costly to manufacture and having less weight to transport.

SUMMARY OF THE INVENTION

Accordingly, the present invention is directed to a support structure that overcomes the limitations and disadvantages of the related art.

Additional features and advantages of the invention will be set forth in the description which follows, and in part will be apparent from the description, or may be learned by practice of the invention. The objective and other advantages of the invention will be realized and attained by the support structure for supporting a load particularly pointed out in the written description and claims hereof as well as the appended drawings.

To achieve these and other advantages in accordance with the purpose of the invention, as embodied and broadly described, the invention comprises a core of connected strips including spacer strips of corrugated material and bent strips of laminated material. The bent strips are disposed between opposing spacer strips and secured to opposing spacer strips at bend surfaces spaced apart along the bent strips. Any two of the bent strips will be secured to opposite sides of at least one of the spacer strips. The bent strips and the opposing spacer strips have edge surfaces for supporting the load. The edge surfaces define a plane substantially perpendicular to the bend surfaces. The spacer strips and the bent strips are preferably made of corrugated paperboard, plastic, and/or metal and creased at substantially equal intervals to form the bend surfaces along opposite sides of the bent strips. The opposing spacer strips are preferably parallel. An adhesive is applied along the bend surfaces for securing the bent strips to the opposing spacer strips and for holding the bent strips at a predetermined pitch angle. The pitch angle between the bent surfaces is preferably between about 30 and 150 degrees.

The invention may also include a cover wrapped substantially around the core for further reinforcing and restricting movement of the strips. Preferably, the cover is adhesively secured to the core and may include a plurality of paperboard sheets or liner board. Alternatively, the cover may be made of plastic or metal or any combination of paper, plastic, and metal.

Further, the invention may be formed into a plurality of individual cores of connected strips, each of the cores including spacer strips of corrugated material and bent strips of laminated material. The bent strips are disposed between opposing spacer strips and secured to opposing spacer strips at bend surfaces spaced apart along each of the bent strips. Any two of the bent strips are secured to opposite sides of at least one of the spacer strips. The bent strip and the opposing spacer strips have edge surfaces for supporting the load. The edge surfaces define a plane substantially perpendicular to the bend surfaces. At least two of the cores are aligned substantially in parallel and at least one of the cores interconnect the parallel cores to provide a support surface therebetween. A cover individually wraps around a substantial portion of the interconnecting cores for restricting movement of the strips within each of the covers, whereby each of the interconnecting cores and a corresponding cover defines a core and cover combination. The interconnecting core and cover combination is preferably substantially perpendicular to the parallel cores.

Additionally, the invention may be formed into a core of connected corrugated layers of corrugated material, each of the layers having a corrugated liner and corrugated fluting having bend surfaces. The corrugated fluting extends in a first direction and is connected at the bend surfaces to the corrugated liner. Each of the layers are attached such that the corrugated fluting of one layer adheres to the corrugated liner of an adjoining layer. The layers have edged surfaces for supporting the load. The edged surfaces define a plane substantially perpendicular to the first direction.

It is to be understood that both the foregoing general description and the following detailed description are exemplary and explanatory only, and are not restrictive of the invention, as claimed.

BRIEF DESCRIPTION OF THE DRAWINGS

The accompanying drawings are included to provide a further understanding of the invention and are incorporated in and constitute a part of this specification. The drawings illustrate several embodiments of the invention and together with the description, serve to explain the principles of the invention. In the drawings.

DESCRIPTION OF THE PREFERRED EMBODIMENTS

Figure 1A:
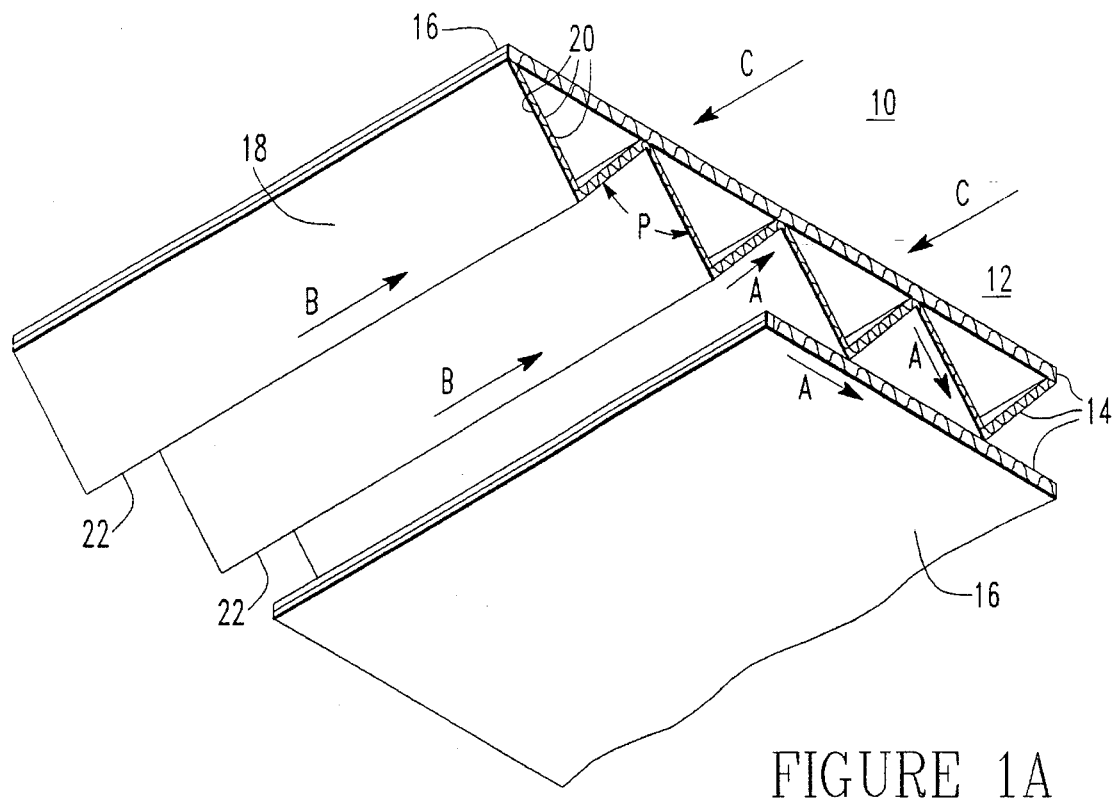
FIGS. 1A–1D are perspective views partially cut-away of support structures according to the present invention.
Figure 1B:
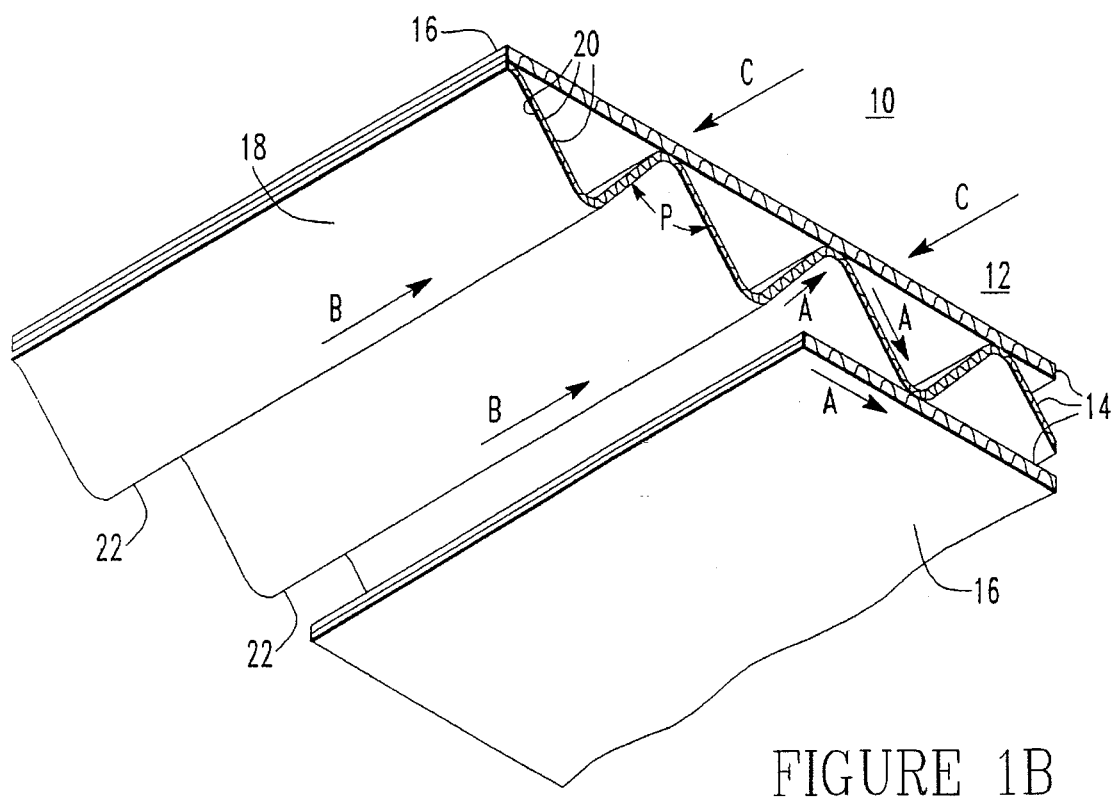
Figure 1C:
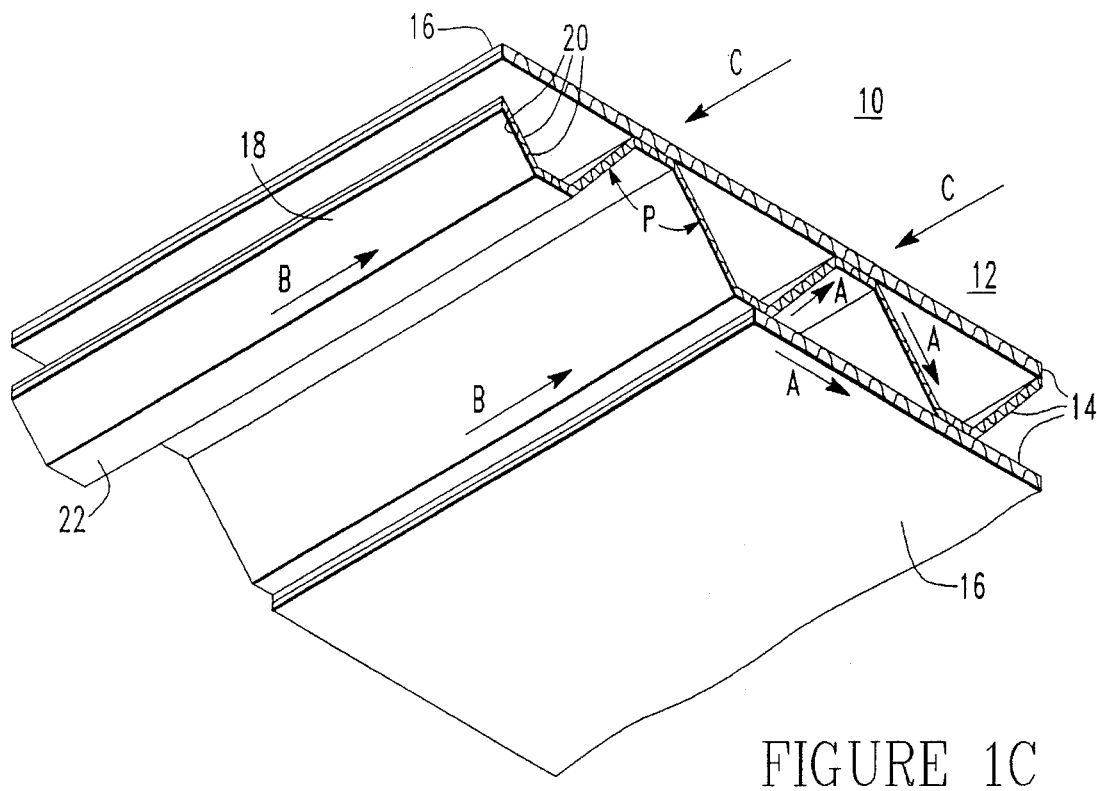

Reference will now be made in detail to the present preferred embodiments of the invention, examples of which are illustrated in the accompanying drawings. The exemplary embodiment of a support structure in accordance with the present invention is shown in FIGS. 1A–1D and is designated generally by the reference numeral 10.

Figure 2A:
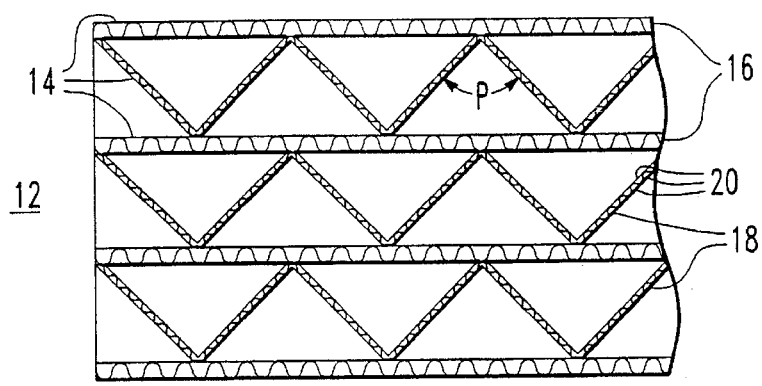
FIG. 2A–2C are a top views of built-up support structures according to the present invention.
Figure 2B:
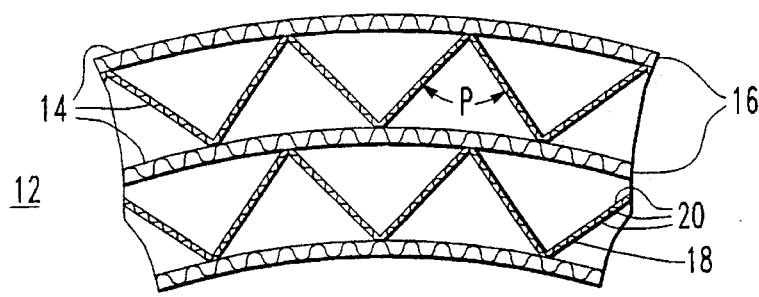
Figure 2C:
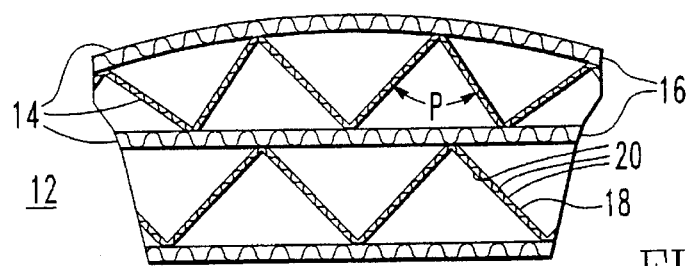

As embodied herein and as shown in FIG. 1A, the support structure 10 for supporting a load includes a core 12 of connected strips 14 including spacer strips 16 of corrugated material and at least one bent strip 18 of laminated material 20. The bent strip 18 is disposed between opposing spacer strips 16 and secured to opposing spacer strips at bend surfaces 22 spaced apart along the bent strip 18. The bent strip 18 and the opposing spacer strips 16 have edge surfaces designated generally by arrows A. The edge surfaces define a plane substantially perpendicular to the bend surfaces 22 as further designated along arrow B. The direction of the compressive load, for which the support structure 10 is particularly well adapted, is indicated by arrows C. The spacer strips 16 are preferably substantially parallel. However, the spacer strips 16 may be curved, parallel, or a combination of the two as shown in FIGS. 2A–2C. While the preferred spacer strips 16 are substantially parallel, it is contemplated as well within the scope of this invention that the spacer strips 16 may be configured into various shapes depending on the design requirements of the support structure 10.

The spacer strips 16 and bent strip 18 are preferably formed of corrugated paperboard. Alternatively, depending on the strength and weight requirements of the support structure to be designed and the environment in which it will be used, the spacer strips 16 and bent strip 18 may be formed of plastic and/or metal or a combination of materials selected from plastic, paper, and metal.

The bent strip 18 is preferably formed of corrugated paperboard when the spacer strips 16 are made of corrugated paperboard. However, many multiple layer paper laminates may provide the stiffness and spacing to meet the strength, rigidity and weight requirements of a particular design. Another preferred multiple paper laminate for the bent strip 18 is chip board.

The bent strip 18 may be creased at substantially equal intervals to form the bent surfaces 22 along opposite sides of the bent strip 18. Preferably, an adhesive is applied along the bend surfaces 22 for securing the bent strip 18 to the opposing spacer strips 16 and for holding the bent strip 18 at a predetermined pitch angle P. Alternatively, an additional adhesive may not be necessary for securing the bent surfaces 22 of the bent strip 18 to the opposing spacer strips 16. For example, the entire support structure is injection molded out of plastic so the strips are integrally connected to one another. In addition to separating the spacer strips 16 to provide a strong and light-weight support structure 10, the bent strips 18 strengthen and reinforce the spacer strips 16 traverse of their plane. The bent strip 18 may have bend surfaces 22 that are sharp creases, gradual curves, or substantially planar contact surfaces, as shown in FIGS. 1A–1D.

Figure 1D:
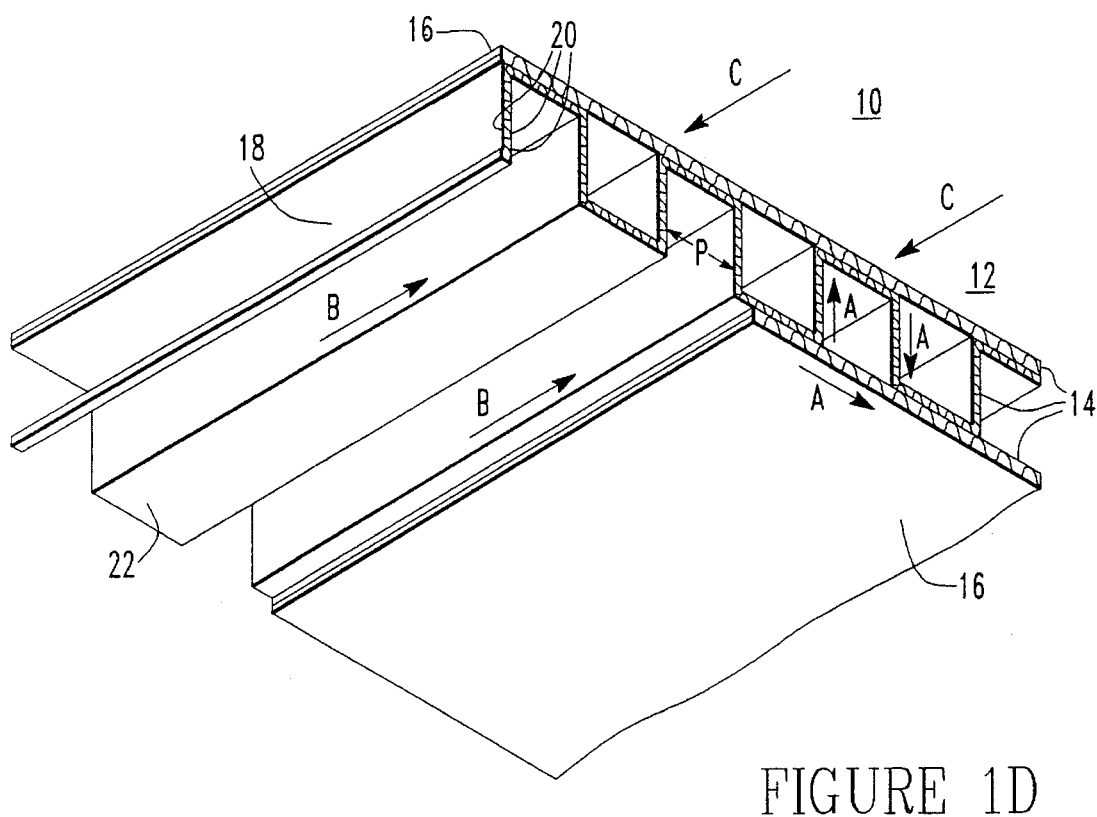

The pitch angle is preferably between about 30 and 150 degrees. A more preferred pitch angle P is about 110 degrees. However, as shown in FIG. 1D, the pitch angle P may be zero degrees if one desires a support structure 10 having portions of the bent strip 18 perpendicular to the plane of the opposing spacer strips 16. Moreover, the bend surfaces 22 and pitch angle P may be varied along the bent strip 18 for meeting different strength, rigidity, and weight requirements of a desired support structure 10.

Figure 3:
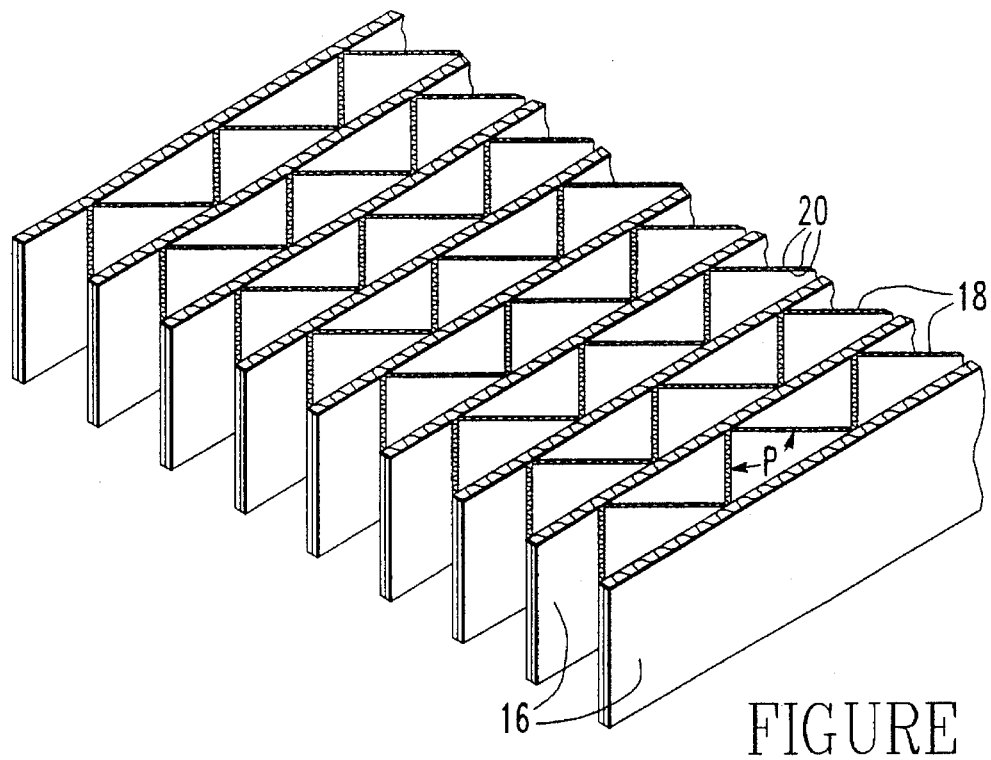
FIG. 3 is yet another embodiment of a support structure having multiple layers according to the present invention.
Figure 4:
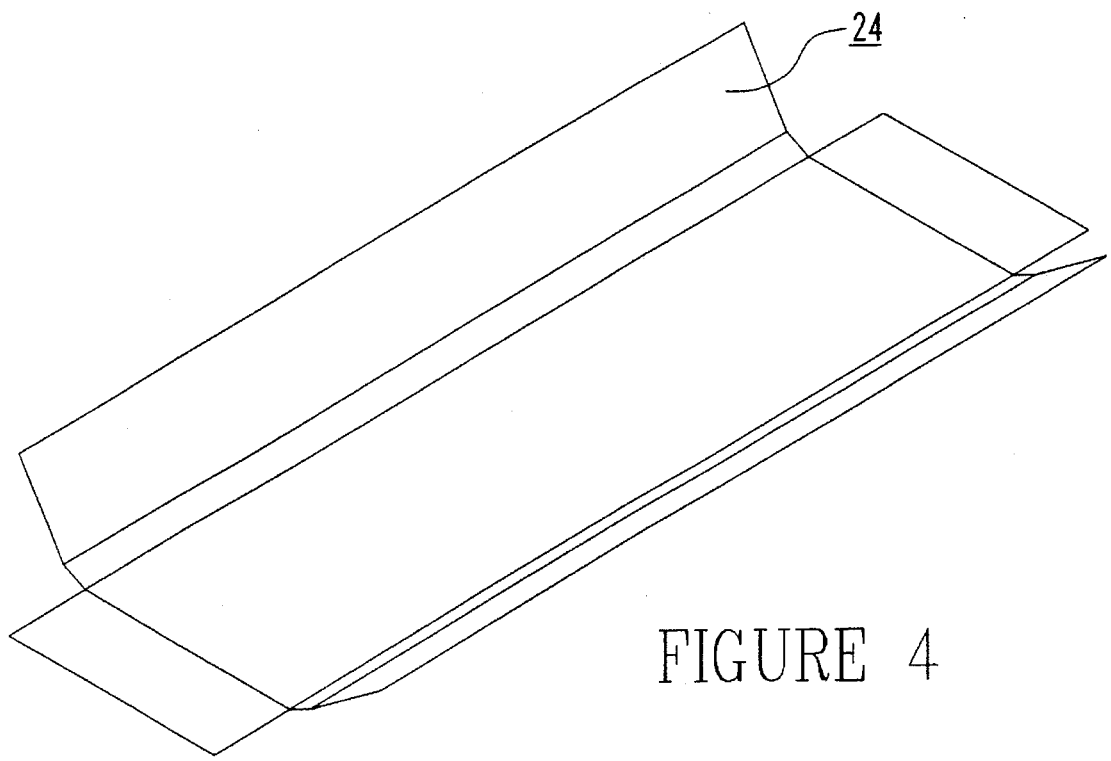
FIG. 4 is a perspective view of a cover for substantially wrapping around a multiple layer support structure according to the present invention.

FIG. 3 shows another embodiment of multiple layer support structure having a thin rectangular shape. This particular embodiment is similar to one typically used for shelves or planks. As shown in FIG. 4, a cover 24 may be wrapped substantially around the core 12 for further reinforcing and restricting movement of the strips. Preferably, the cover 24 is adhesively secured to the core 12. The cover 24 may include a plurality of paperboard sheets or have at least one sheet of linerboard. Alternatively, a light weight cover or veneer may be added for cosmetic reasons.

Alternatively, the cover 24 may be formed of a material selected from plastic, paper, and metal or any combination thereof. For a metal support structure, such as one composed of corrugated aluminum foil or sheeting, in lieu of an adhesive, a welding process may be utilized for securing the strips together. For a plastic support structure, the bent strips may be preheated for attachment to the spacer strips. A plastic cover may be especially useful in an environment where moisture would otherwise degrade the structural integrity of a paperboard core of spacer strips 16 and bent strips 18.

A preferred support structure 10 for supporting a load includes a plurality of individual cores 12 of connected strips 14. Each of the cores 12 includes spacer strips 16 of corrugated material and bent strips 18 of laminated material 20. Bent strips 18 are disposed between opposing spacer strips 16 and secured to opposing spacer strips at bend surfaces 22 spaced apart along each of the bent strips 18. Any two of the bent strips 18 are secured to opposite sides of at least one of the spacer strips 16. The bent strips 18 and the opposing spacer strips 16 have edge surfaces for supporting the load. The edge surfaces define a plane substantially perpendicular to the bend surfaces 22. At least two of the cores 12 are aligned substantially in parallel and at least one of the cores 12 interconnect the parallel cores 26 to provide a support surface therebetween. A cover 24 individually wrapped around a substantial portion of each of the interconnecting cores 28 provides for restricting movement of the strips 14 within each of the covers 24. The interconnecting core 28 and cover 24 combination is preferably substantially parallel to the parallel cores 26.

A preferred support structure 10 formed of corrugated paperboard uses sixty-nine pound paperboard to make the corrugated paperboard of the spacer strips 16. A preferred bent strip 18 formed from corrugated paperboard may use sixty-nine pound paperboard as well. However, the preferred fluting of the spacer strips 16 is a b flute, while the preferred fluting of the bent strips 18 is an e flute. The opposed spacer strips 16 are preferably 0.7 inches apart. A twelve inch segment of a preferred support structure may include spacer strips 16 that are twelve inches long and a bent strip 18 that is approximately eighteen inches long when stretched flat.

Figure 5:
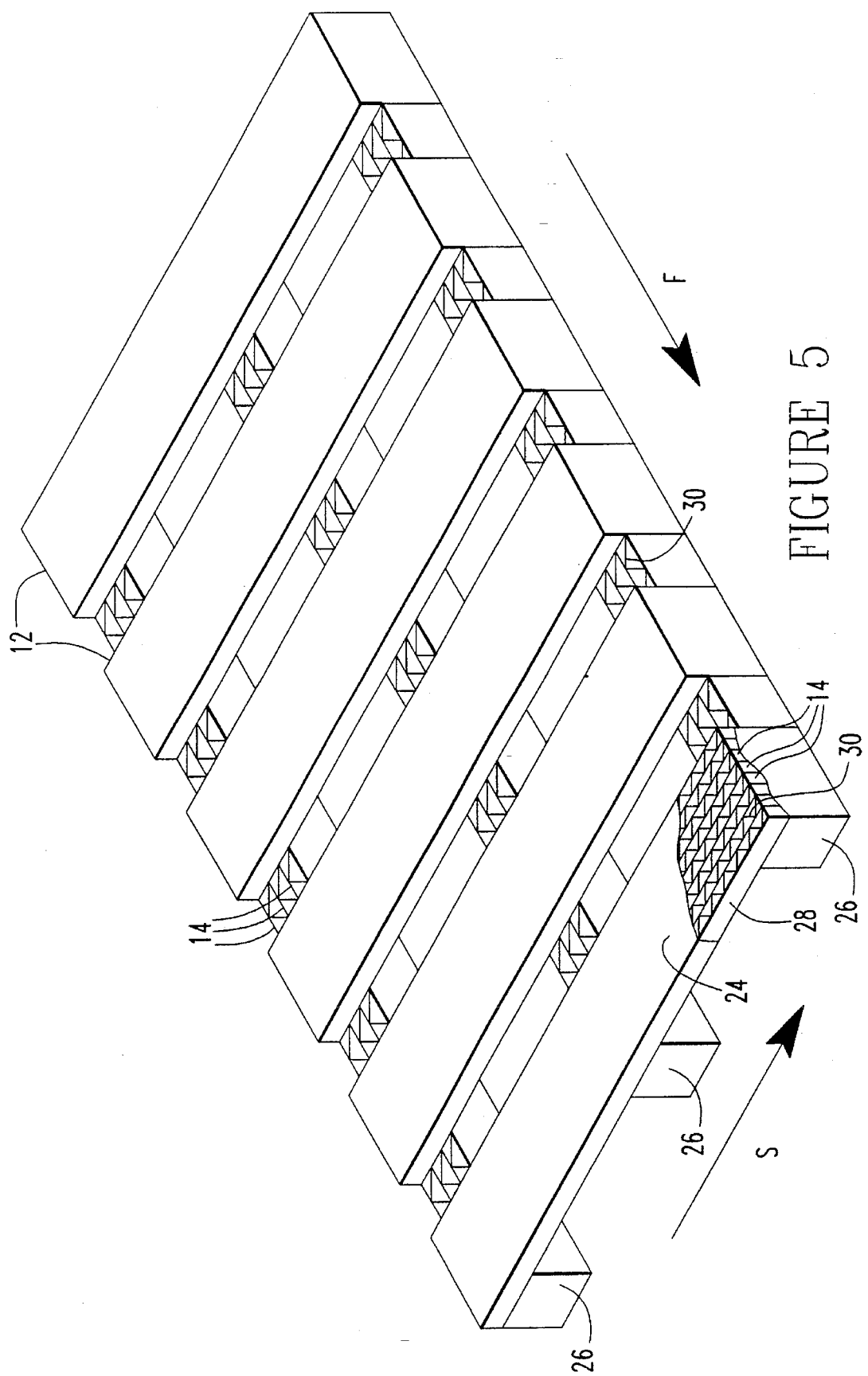
FIG. 5 is a perspective view, partially cut away, of a skid according to the present invention.
Figure 6:
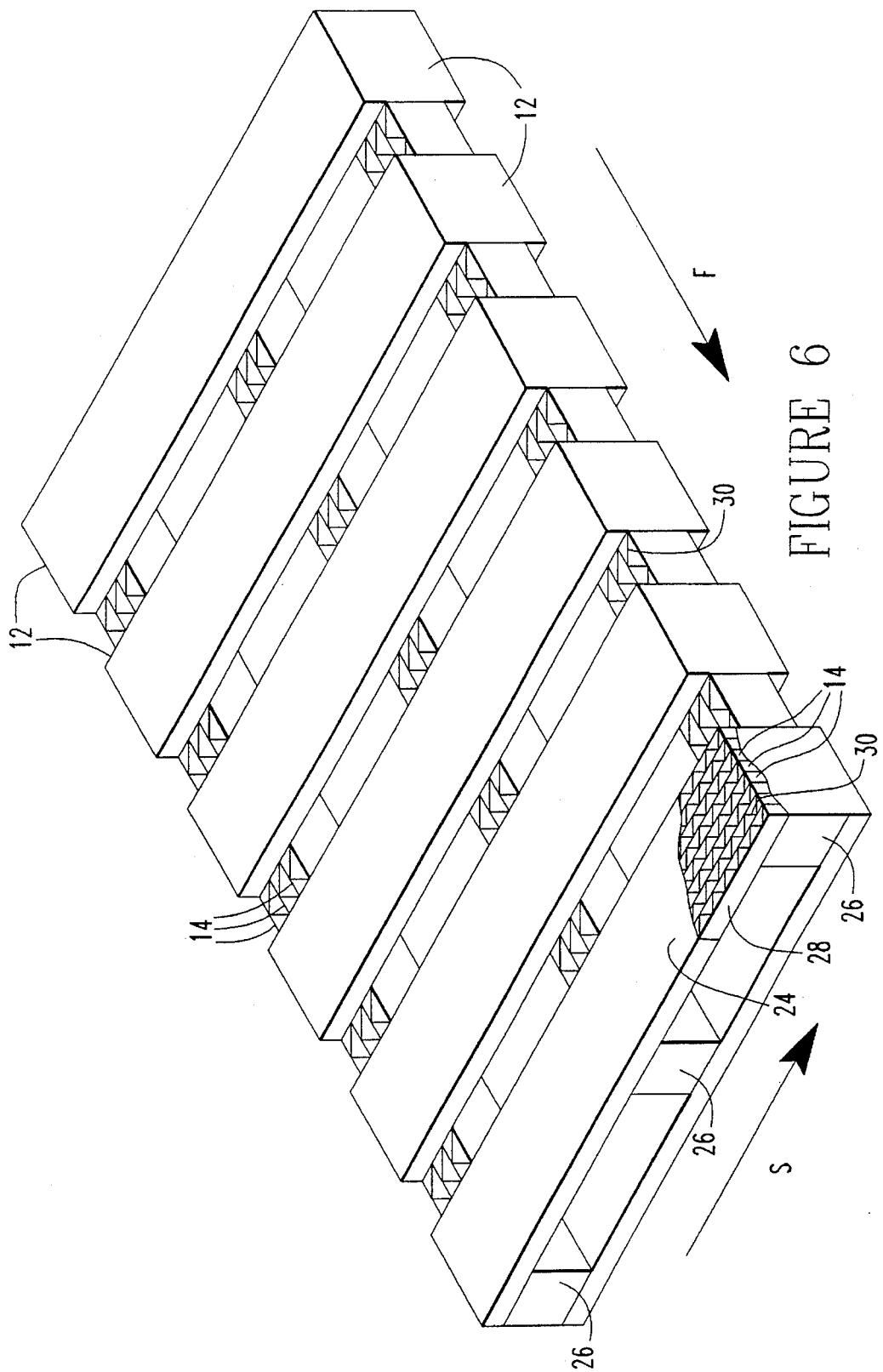
FIG. 6 is a perspective view, partially cut away, of a pallet according to the present invention.
Figure 7:
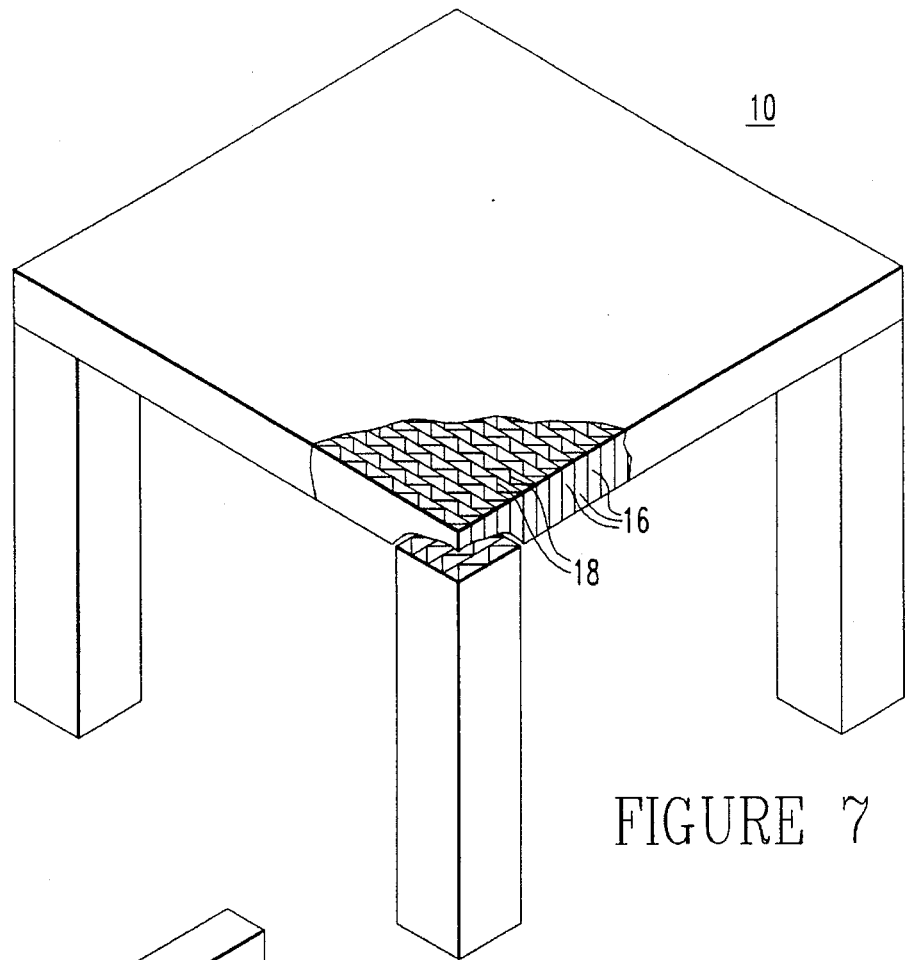
FIG. 7 is a perspective view, partially cut away, of a table according to the present invention.
Figure 8:
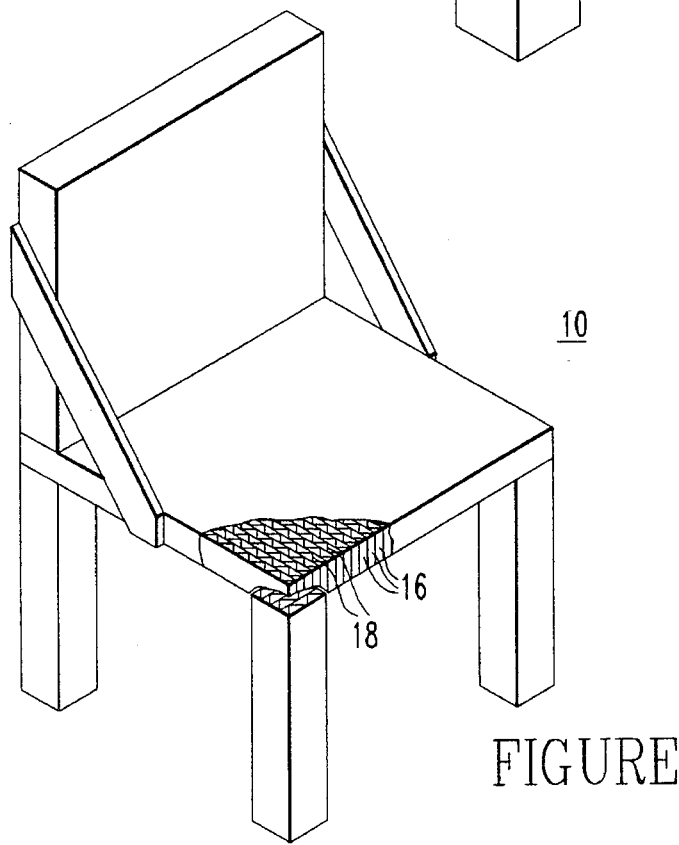
FIG. 8 is a perspective view, partially cut away, of a chair according to the present invention.

A preferred application of the support structure 10 for supporting a load is a skid, as illustrated in FIG. 5. A skid includes a plurality of individual cores 12 of connected paper strips 14 as defined in the previous paragraph. In the skid of FIG. 5, the corrugations 30 of the lower cores 26 define a first fluting direction F and corrugations 30 of the upper core 28 define a second fluting direction S. The first and second fluting directions F, S are substantially perpendicular.

In operation, an eighteen inch square section of the skid illustrated in FIG. 5 is capable of supporting more than four thousand two hundred pounds of weight. The two parallel cores 26 being tested were two and a half inches wide by four inches high. The parallel cores 26 included four spacer strips 16 having three bent strips 18 disposed between and secured to the spacer strips 16. The two interconnecting cores 28 were six and a half inches wide by one inch high. The interconnecting cores 28 included seven spacer strips 16 with six bent strips 18 disposed between and secured to the spacer strips 16.

The present invention has utility in a connection with a wide variety of support structures. For example, as illustrated in FIGS. 3, 6, 7 and 8, support structures embodying features of the present invention may include shelves, pallets, tables, and chairs, to name a few. The support structure may include three substantially parallel spacer strips 16 of corrugated material and bent strips 18 of laminated material At least one of the bent strips 18 is interposed between each of the spacer strips 16. The bent strips 18 are adhesively secured to the spacer strips 16 at bend surfaces 22 spaced apart along the bent strips 18. Selected ones of the bent strips 18 are secured along opposite sides of at least one of the spacer strips 16. The spacer strips 16 and the bent strips 18 have edged surfaces for supporting the load. The edged surfaces define a plane substantially perpendicular to the bend surfaces 22.

The present invention enables the construction of a durable support structure that is made from strips of corrugated material and a bent strip of laminated material. The strength and weight of the corrugated material itself can be increased or decreased according to the needs of the user. The bent strip can have its number of laminated layers changed by modifying the type of material used or by modifying the thickness of the material accordingly. The number and thickness of cores and the choice of spacer strip and bent strip materials along with the cover can be varied. The present invention provides an easy and quick way to change a support structure in size, weight, strength, and rigidity to meet the requirements of the loads to be placed upon it by simply modifying the selected materials, adding or removing layers from the cores, adjusting the number of cores themselves, and adjusting the cover sheets to be added. The present invention provides a support structure with reduced weight and increased strength characteristics by utilizing the edge-wise strength of the selected materials in a geometric configuration that exploits the strength characteristics of corrugation beyond that known in the art.

While there has been illustrated and described what is at present considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed herein, but that the invention include all embodiments falling within the scope of the appended claims.

I claim:

1. A support structure for supporting a load comprising:

a plurality of individual cores of connected strips, each of said cores including spacer strips of corrugated material and bent strips of laminated material, said bent strips being disposed between opposing spacer strips and secured to opposing spacer strips at bend surfaces spaced apart along each of said bent strips, wherein any two of said bent strips are secured to opposite sides of at least one of said spacer strips;

said bent strips and said opposing spacer strips having edge surfaces for supporting the load, said edge surfaces defining a plane substantially perpendicular to said bend surfaces; and whereby two of said cores are interconnected by another one of said cores to provide a support surface therebetween.

2. The support structure as defined in claim 1, wherein said one of said cores is stacked on said two cores.

3. The support structure as defined in claim 1, wherein said one of said cores is adhesively secured to said two cores.

4. The support structure as defined in claim 1, wherein said spacer strips and said bent strips are formed of corrugated paperboard.

5. The support structure as defined in claim 1, wherein said spacer strips are formed of corrugated paperboard and said bent strips are formed of chipboard.

6. The support structure as defined in claim 1, wherein said spacer strips and said bent strips are formed of material selected from plastic, paper, and metal.

7. The support structure as defined in claim 1, wherein said opposing spacer strips are curved.

8. The support structure as defined in claim 1, wherein said opposing spacer strips are substantially parallel and said bend surfaces define a substantially planar contact surface.

9. The support structure as defined in claim 8, wherein said bent strips are creased at substantially equal intervals to form said bend surfaces along opposite sides of said bent strips.

10. The support structure as defined in claims 1 or 9, also including an adhesive applied along said bend surfaces for securing said bent strips to said opposing spacer strips and for holding said bent strips at a predetermined pitch angle.

11. The support structure as defined in claim 10, wherein said pitch angle is between about 30 and about 150 degrees.

12. The support structure as defined in claim 11, wherein said pitch angle is about 110 degrees.

13. The support structure as defined in claim 11, wherein said pitch angle varies along said bent strips.

14. The support structure as defined in claim 1, further comprising a cover wrapped substantially around at least one of said cores for further reinforcing and restricting movement of said strips.

15. The support structure as defined in claim 14, wherein said cover is adhesively secured to at least one of said cores.

16. The support structure as defined in claim 14, wherein said cover includes a plurality of paperboard sheets.

17. The support structure as defined in claim 14, wherein said cover includes at least one sheet of liner board.

18. The support structure as defined in claim 14, wherein said cover is formed of material selected from plastic, paper, and metal.

19. A support structure for supporting a load comprising:
a plurality of individual cores of connected strips, each of said cores including spacer strips of corrugated material and bent strips of laminated material, said bent strips being disposed between opposing spacer strips and secured to opposing spacer strips at bend surfaces spaced apart along each of said bent strips, wherein any two of said bent strips are secured to opposite sides of at least one of said spacer strips;

said bent strips and said opposing spacer strips having edge surfaces for supporting the load, said edge surfaces defining a plane substantially perpendicular to said bend surfaces;

at least two of said cores being aligned substantially in parallel and at least one of said cores interconnecting said parallel cores to provide a support surface therebetween; and covers individually wrapped around a substantial portion of each of said cores for restricting movement of said strips within each of said covers, whereby each of said cores and a corresponding cover defines a core and cover combination.

20. The support structure as defined in claim 19, wherein said spacer strips, said bent strips, and said covers are formed of material selected from plastic, paper, and metal.

21. The support structure as defined in claim 19, wherein said at least one interconnecting core and cover combination is substantially perpendicular to said parallel cores.

22. The support structure as defined in claim 19, wherein the support structure is a table.

23. The support structure as defined in claim 19, wherein the support structure is a shelf.

24. The support structure as defined in claim 19, wherein the support structure is a chair.

25. The support structure as defined in claim 19, wherein the support structure is a pallet.

26. The support structure as defined in claim 19, wherein the support structure is a skid.

27. The support structure as defined in claim 19, wherein said one of said cores is stacked on said two cores.

28. The support structure as defined in claim 19, wherein said one of said cores is adhesively secured to said two cores.

29. A skid comprising:
a plurality of individual cores of connected strips, each of said cores including spacer strips of corrugated material and bent strips of laminated material, said bent strips being disposed between opposing spacer strips and secured to opposing spacer strips at bend surfaces apart along said bent strips, wherein any two of said bent strips are secured to opposite sides of at least one of said spacer strips;

said bent strips and said opposing spacer strips having edge surfaces for supporting the load, said edge surfaces defining a plane substantially perpendicular to said bend surfaces;

at least two of said cores being aligned substantially in parallel and at least one of said cores interconnecting said parallel cores to provide a support surface therebetween; and covers individually wrapped around a substantial portion of each of said interconnecting cores for restricting movement of said strips within each of said covers, whereby each of said cores and a corresponding cover defines a core and cover combination.

30. The skid as defined in claim 29, wherein corrugations of said parallel cores define a first fluting direction and corrugations of said at least one interconnecting core and cover combination define a second fluting direction, said first and second fluting directions being substantially perpendicular.

31. The support structure as defined in claim 29, wherein said spacer strips and said bent strips are corrugated paperboard.

32. The support structure as defined in claim 29, wherein said spacer strips are formed of corrugated paperboard and said bent strips are chipboard.

33. The support structure as defined in claim 29, wherein said spacer strips, said bent strips, and said covers are formed of material selected from plastic, paper, and metal.

34. The support structure as defined in claim 29, wherein said opposing spacer strips are curved.

35. The support structure as defined in claim 29, wherein said opposing spacer strips are substantially parallel.

36. The support structure as defined in claim 35, wherein said bent strips are creased at substantially equal intervals to form said bend surfaces along opposite sides of said bent strips.

37. The support structure as defined in claims 24 or 29, also including an adhesive applied along said bend surfaces for securing said bent strips to said opposing spacer strips and for holding said bent strips at a predetermined pitch angle.

38. The support structure as defined in claim 37, wherein said pitch angle is between about 30 and about 150 degrees.

39. The support structure as defined in claim 37, wherein said pitch angle is about 110 degrees.

40. The support structure as defined in claim 37, wherein said pitch angle varies along said bent strip.

41. The support structure as defined in claim 29, wherein said cover is adhesively secured to at least one of said cores.

42. The support structure as defined in claim 29, wherein said cover includes a plurality of paperboard sheets.

43. The support structure as defined in claim 29, wherein said cover includes at least one sheet of liner board.

44. The skid as defined in claim 29, wherein said one of said cores is stacked on said two cores.

45. The skid as defined in claim 29, wherein said one of said cores is adhesively secured to said two cores.

46. A support structure for supporting a load comprising:

a plurality of individual cores of connected strips, each of said cores including at least three substantially parallel spacer strips of corrugated material and bent strips of laminated material, at least one of said bent strips being interposed between each of said spacer strips, said bent strips being adhesively secured to said spacer strips at bend surfaces spaced apart along each of said bent strips, wherein selected ones of said bent strips are secured along opposite sides of at least one of said spacer strips;

said spacer strips and said bent strips having edge surfaces for supporting the load, said edge surfaces defining a plane substantially perpendicular to said bend surfaces; and whereby two of said cores are interconnected by another one of said cores to provide a support surface therebetween.

47. The support structure as defined in claim 46, also including means enveloping a portion of said core for restricting movement of said spacer strips and said bent strips.

48. The support structure as defined in claim 46, wherein portions of said bent strips extending between said bend surfaces are substantially planar.

49. The support structure as defined in claim 46, wherein said laminated material is corrugated paperboard.

50. The support structure as defined in claim 46, wherein said spacer strips and said bent strips are formed of material selected from plastic, paper, and metal.

51. The support structure as defined in claim 46, wherein said one of said cores is stacked on said two cores.

52. The support structure as defined in claim 46, wherein said one of said cores is adhesively secured to said two cores.

53. A support structure for supporting a load comprising:

cores of connected corrugated layers of corrugated material, each of said layers having a corrugated liner and corrugated fluting having bend surfaces, said corrugated fluting extending in a first direction and being connected at said bend surfaces to said corrugated liner, each of said layers being attached such that said corrugated fluting of one layer adheres to said corrugated liner of an adjoining layer, wherein said layers include edge surfaces for supporting the load, said edge surfaces defining a plane substantially perpendicular to said first direction, and whereby two of said cores are interconnected by another one of said cores to provide a support surface therebetween.

54. The support structure as defined in claim 53, wherein said one of said cores is stacked on said two cores.

55. The support structure as defined in claim 53, wherein said one of said cores is adhesively secured to said two cores.

56. A support structure for supporting a load comprising:

cores of connected corrugated layers of corrugated material, each of said layers having a corrugated liner and corrugated fluting having bend surfaces, said corrugated fluting being connected at said bend surfaces to said corrugated liner, each of said layers being attached such that said corrugated fluting of one layer adheres to said corrugated liner of an adjoining layer, whereby two of said cores are interconnected by another one of said cores to provide a support surface therebetween.

57. The support structure as defined in claim 46, wherein said one of said cores is stacked on said two cores.

58. The support structure as defined in claim 46, wherein said one of said cores is adhesively secured to said two cores.

59. The support structure as defined in claim 46, wherein at least one of said corrugated liner and said corrugated fluting of said layers has two liner sheets and a corrugated sheet between said two liner sheets.

60. A support structure for supporting a load comprising:

at least two spaced longitudinal support members having substantially planar spacer strips of corrugated material and bent strips interposed between said spacer strips and secured to said spacer strips at bend surfaces spaced apart along each of said bent strips, wherein any two of said bent strips are secured to opposite sides of at least one of said spacer strips; and at least one cross-member connecting said at least two of said longitudinal support members, said cross-member defining a support surface for supporting the load.

61. The support structure as defined in claim 50, wherein said spacer strips are formed of corrugated paperboard.

62. The support structure as defined in claim 50, wherein said bent strips are formed of corrugated material.

63. The support structure as defined in claim 52, wherein said bent strips are formed of corrugated paperboard.

64. The support structure as defined in claim 50, wherein said at least one cross-member includes spacer strips of corrugated material and bent strips interposed between said spacer strips and secured to said spacer strips at bend surfaces spaced apart along each of said bent strips.

65. The support structure as defined in claim 54, wherein said spacer strips are formed of corrugated paperboard.

66. The support structure as defined in claim 54, wherein said bent strips are formed of corrugated material.

67. The support structure as defined in claim 56, wherein said bent strips are formed of corrugated paperboard.

* * * * *

UNITED STATES PATENT AND TRADEMARK OFFICE
CERTIFICATE OF CORRECTION

PATENT NO. : 5,537,936
DATED : July 23, 1996
INVENTOR(S) : Daniel CORDREY

It is certified that error appears in the above-indentified patent and that said Letters Patent is hereby corrected as shown below:

Claim 37, col. 8, line 66, "claims 24 or 29" should read --claims 29 or 35--.

Claim 57, col. 10, line 23, "claim 46" should read --claim 56--.

Claim 58, col. 10, line 25, "claim 46" should read --claim 56--.

Claim 59, col. 10, line 28, "claim 46" should read --claim 56--.

Claim 61, col. 10, line 44, "claim 50" should read --claim 60--.

Claim 62, col. 10, line 46, "claim 50" should read --claim 60--.

Claim 63, col. 10, line 48, "claim 52" should read --claim 62--.

Claim 64, col. 10, line 50, "claim 50" should read --claim 60--.

Claim 65, col. 10, line 55, "claim 54" should read --claim 64--.

Claim 66, col. 10, line 57, "claim 54" should read --claim 64--.

UNITED STATES PATENT AND TRADEMARK OFFICE
CERTIFICATE OF CORRECTION

PATENT NO. : 5,537,936
DATED : July 23, 1996
INVENTOR(S) : Daniel CORDREY

It is certified that error appears in the above-indentified patent and that said Letters Patent is hereby corrected as shown below:

Claim 67, col. 10, line 59, "claim 56" should read --claim 66--.

Signed and Sealed this

Twenty-ninth Day of October 1996

Attest:

BRUCE LEHMAN

Attesting Officer

Commissioner of Patents and Trademarks